(12) United States Patent
Im et al.

(10) Patent No.: US 6,454,967 B1
(45) Date of Patent: Sep. 24, 2002

(54) GREEN-EMITTING PHOSPHORS FOR PLASMA DISPLAY PANEL AND PREPARING METHOD THEREOF

(75) Inventors: Seoung-jae Im, Yongin (KR); Oshir Ya Manashirov, Stavropol (RU)

(73) Assignee: Samsung SDI Co., Ltd. (KR)

( * ) Notice: Subject to any disclaimer, the term of this patent is extended or adjusted under 35 U.S.C. 154(b) by 0 days.

(21) Appl. No.: 09/702,851

(22) Filed: Nov. 1, 2000

(30) Foreign Application Priority Data

Nov. 4, 1999 (KR) .............................. 99-48590

(51) Int. Cl.$^7$ .................. C09K 11/63; C09K 11/64; C09K 11/55
(52) U.S. Cl. ................................. 252/301.4 R
(58) Field of Search ................... 252/301.4 R

(56) References Cited

U.S. PATENT DOCUMENTS 4,085,351 A * 4/1978 Takahashi et al. .......... 313/486
5,868,963 A * 2/1999 Thi et al. .............. 252/301.4 R

* cited by examiner

Primary Examiner—C. Melissa Koslow
(74) Attorney, Agent, or Firm—Burns, Doane, Swecker & Mathis, L.L.P.

(57) ABSTRACT

Disclosed is a green-emitting phosphor for a plasma display panel, represented by the formula 1:

$$Ba_{1-x}Mn_xAl_{12-y}B_yO_{19} \quad \text{[Formula 1]}$$

wherein $0.001 \leq x \leq 0.5$ and $0.01 \leq y \leq 1.0$. The green-emitting phosphor has excellent color purity and luminance characteristics and shows an increased white color temperature of 9000 K or higher and a wide color reproducibility when it is applied to a plasma display panel, thereby improving picture quality characteristics.

6 Claims, No Drawings

GREEN-EMITTING PHOSPHORS FOR PLASMA DISPLAY PANEL AND PREPARING METHOD THEREOF

This application claims priority under 35 U.S.C. §§ 119 and/or 365 to 99-48590 filed in Korea on Nov. 4. 1999; the entire content of which is hereby incorporated by reference.

BACKGROUND OF THE INVENTION

1. Field of the Invention

The present invention relates to green-emitting phosphors for a plasma display panel (PDP) and a preparing method thereof, and more particularly, to green-emitting phosphors having excellent color purity and luminance characteristics so as to be capable of enhancing white color temperature and color reproducibility characteristics of a PDP, and a preparing method thereof.

2. Description of the Related Art

A general PDP forms a picture image using the luminance of a plasma discharge, or phosphors excited by a discharge, and operates by the following principle. That is, a predetermined voltage is applied to two electrodes installed in a discharge space of the PDP to cause a plasma discharge therebetween, and a phosphor layer having a predetermined pattern is excited by ultraviolet rays from the a plasma discharge, causing glow discharge, thereby forming a picture image.

Among materials for forming the phosphor layer, zinc silicate phosphors having excellent luminance characteristics are mainly used as green-emitting phosphors. Examples of the zinc silicate phosphors include $Zn_2SiO_4$:Mn, that is, manganese activated zinc orthosilicate, which, while poor in view of color purity, has excellent luminance characteristics.

With developments in the architecture and manufacturing process of a PDP, it has become a critical issue to improve the luminance of the PDP and to increase a white color temperature by improving the color purity of the PDP. Thus, a method was conventionally proposed in which a mixture of $Zn_2SiO_4$:Mn phosphor having excellent luminance but poor color purity and a barium aluminate phosphor having low luminance but excellent color purity was used.

However, even if the mixture of a zinc silicate phosphor and a barium aluminate phosphor is used, satisfactory color purity and luminance characteristics cannot be attained and there is still much room for improvement.

SUMMARY OF THE INVENTION

To solve the above problems, it is an object of the present invention to provide a green-emitting phosphor for a plasma display panel having excellent color purity and luminance characteristics, by which the white color temperature of the plasma display panel can be increased and color reproducibility can be enhanced.

It is another object of the present invention to provide a method of preparing the green-emitting phosphor for a plasma display panel.

Accordingly, to achieve the first object, there is provided a green-emitting phosphor for a plasma display panel, represented by the formula 1:

$$Ba_{1-x}Mn_xAl_{12-y}B_yO_{19} \quad \text{[Formula 1]}$$

wherein $0.001 \leq x \leq 0.5$ and $0.01 \leq y \leq 1.0$.

To achieve the second object, there is provided a method for preparing a green-emitting phosphor for a plasma display panel, represented by the formula 1:

$$Ba_{1-x}Mn_xAl_{12-y}B_yO_{19} \quad \text{[Formula 1]}$$

wherein $0.001 \leq x \leq 0.5$ and $0.01 \leq y1.0$, the method comprising the steps of primarily firing a mixture of barium (Ba), manganese (Mn), aluminum (Al) and boron (B) compounds at 1000 to 1500° C. in the presence of air, and secondarily firing the resultant material at 1000 to 1500° C. under a reducing gas atmosphere.

DETAILED DESCRIPTION OF THE INVENTION

Green-emitting phosphors for a plasma display panel are mostly caused to glow by incident UV light, that is, radiation with a wavelength of about 147 nm, and luminescence occurs only at the surface of a phosphor. Thus, the luminosity efficiency of a phosphor is considerably dependent on the presence of defects on the surface.

The present invention provides a green-emitting phosphor having a structure represented by the formula (1) by adding a boron (B) compound to a barium aluminate phosphor $BaAl_{12}O_{19}$:Mn illuminated by excited light, that is, radiation with a wavelength of about 147 nm, the green-emitting phosphor having excellent luminance and color purity characteristics. Here, the boron compound increases the absorption ratio of the excited light by increasing an energy band gap of the $BaAl_{12}O_{19}$:Mn phosphor having excellent color purity and improving the crystallinity of the phosphor. Also, the boron compound functions as a flux to reduce the defect of the surface of the phosphor, thereby improving the luminosity efficiency of the phosphor.

$$Ba_{1-x}Mn_xAl_{12-y}B_yO_{19} \quad \text{[Formula (1)]}$$

wherein $0.001 \leq x \leq 0.5$ and $0.01 \leq y \leq 1.0$.

In the green-emitting phosphor represented by the formula (1), x is preferably in the range from 0.03 to 0.3. More preferably, when x is 0.1, y is in the range from 0.2 to 0.4. In particular, when x is 0.1, y is preferably 0.2 to exhibit excellent luminance and color purity characteristics.

The green-emitting phosphor represented by the formula (1) according to the present invention is prepared by a solid-phase method, which will now be described.

First, as starting materials, a Ba compound, an Mn compound, an Al compound and a B compound are. mixed. Here, the mixture ratio by mol of these four compounds is 0.5 to 0.999 mol of Ba compound, 0.001 to 0.5 mole of Mn compound, 11 to 11.99 mol of Al compound and 0.01 to 1.0 mol of B compound. Examples of the Ba compound used include $BaCO_3$, $BaO$, $BaCl_2$, $Ba(NO_3)_2$ and $Ba[OCH(CH_3)_2]_2$. Examples of the Mn compound used include $MnF_2$, $MnCl_2$, $MnO$ and $Mn(NO_3)_2 \cdot XH_2O$ wherein X is an integer of 4 through 6. Examples of the Al compound used include $Al_2O_3$ and $Al(OH)_3$. Examples of the B compound used include $B_2O_3$ and $H_3BO_3$.

Next, the mixture of the Ba, Mn, Al and B compounds is sufficiently stirred and then primarily fired at 1000 to 1500° C. in the presence of air, preferably at 1300 to 1350° C. for 0.5 to 5 hours.

Thereafter, the resultant material is secondarily fired at 1000 to 1500° C. under a reducing gas atmosphere, preferably at 1300 to 1350° C. for 0.5 to 3 hours. The reason of conducting secondary firing under a reducing gas atmosphere is to eliminate an oxidative atmosphere caused by conducting the primary firing in the presence of air and to reduce partially oxidized materials. The reducing gas is not specifically restricted but a mixed gas of nitrogen and hydrogen in the mixture volume ratio of 95 to 5 may be used.

During firing, if the temperature of the primary and secondary firing steps deviates from the above-described range, the luminance of the finally obtained phosphor is undesirably poor.

The phosphor obtained after the secondary firing is washed with 1 to 20% aqueous hydrochloric solution, washed with water, and then dried to obtain a green-emitting phosphor represented by the formula (1). Here, the reason of washing the obtained phosphor with an aqueous hydrochloric solution is to remove unreacted materials or defects remaining on the surface of the phosphor. The drying temperature performed after washing with water is preferably 50 to 120° C. Here, if the drying temperature is lower than 50° C., too much time is required for drying. If the drying temperature is higher than 120° C., aggregation of phosphor particles undesirably occurs.

The green-emitting phosphor obtained according to the above-described method has excellent color purity and luminance characteristics. Also, the obtained green-emitting phosphor increases the white color temperature of a panel to 9000 K or higher. Thus, the picture quality of a PDP can be improved by applying these characteristics to the PDP.

Hereinbelow, the present invention is described more concretely with reference to specific examples intended to illustrate the invention without limiting the scope thereof.

The following examples 1 through 8 are experiments conducted for determining the optimal composition of boron (B) based on 0.1 mol of manganese (Mn), and the following examples 9 through 14 are experiments conducted for determining the optimal composition of Mn based on 0.2 mol of B, for replacement by barium (Ba).

EXAMPLE 1

A mixture of 0.9 mol of $BaCO_3$, 0.1 mol of $MnF_2$, 11.95 mol of $Al_2O_3$ and 0.05 mol of $B_2O_3$ was milled for 1 hour. Subsequently, the mixture was sieved with nylon cloth having a porosity size of 50 μm. The sieving step was repeated three times to screen only fine particles.

The resultant material was packed into a crucible and then primarily fired in a furnace at 1300° C. for 2 hours. Then, the fired product was milled using a mortar and then sieved by nylon cloth having a porosity size of 50 μm, which was repeated three times to screen only fine particles.

Thereafter, the resultant material was fired at 1300° C. for 2 hours in a mixed gas atmosphere of nitrogen and hydrogen with a volume ratio of 95 to 5. Subsequently, the product was sieved with nylon cloth having a porosity size of 50 μm, which was repeated three times to screen only fine particles. The obtained product was washed with 10% aqueous hydrochloric solution and then washed with distilled water several times. The phosphor washed with distilled water was dried at 100° C. for 10 hours, milled and sieved with nylon cloth having a porosity size of 50 μm, which was repeated three times to screen only fine particles.

The phosphor obtained in such a manner was excited by vacuum UV radiation with a wavelength of 146 nm to then measure the relative luminance and color coordinate characteristics of the obtained phosphor. Here, as a reference phosphor for indexing the relative luminance, commercially available $Zn_2SiO_4$:Mn was used.

EXAMPLE 2 THROUGH 8

In each of seven more experiments, a phosphor was prepared in the same manner as described for Example 1, except that the amount of $B_2O_3$ was 0.1, 0.2, 0.3, 0.4, 0.5, 0.75 and 1.0 mol, respectively, and then the relative luminance and color coordinate characteristics of the obtained phosphor were measured.

EXAMPLE 9

In a ninth experiment, a phosphor was prepared in the same manner as described for Example 1, except that 0.99 mol of $BaCO_3$, 0.03 mol of $MnF_2$, 11.8 mol of $Al_2O_3$ and 0.2 mol of $B_2O_3$ were used, and then the relative luminance and color coordinate characteristics of the obtained phosphor were measured.

EXAMPLE 10 THROUGH 14

In each of 5 more experiments corresponding to examples 10 through 14, a phosphor was prepared in the same manner as described for Example 1, except that the contents of $MnF_2$ were 0.05, 0.125, 0.15, 0.2 and 0.3 mol, respectively, and then the relative luminance and color coordinate characteristics of the obtained phosphor were measured.

COMPARATIVE EXAMPLE 1

In a 15th experiment, a phosphor was prepared in the same manner as described for Example 1, except that $B_2O_3$ was not used, and then the relative luminance and color coordinate characteristics of the obtained phosphor were measured.

COMPARATIVE EXAMPLE 2

In a 16th experiment, a phosphor was prepared in the same manner as described for Example 1, except that a mixed phosphor of $BaAl_{12}O_{19}$:Mn and $Zn_2SiO_4$:Mn, mixed in the weight ratio of 1:3, was used instead of the phosphor prepared in Example 1, and then the relative luminance and color coordinate characteristics of the obtained phosphor were measured.

COMPARATIVE EXAMPLE 3

In a $17^{th}$ and final experiment, a phosphor was prepared in the same manner as described for Example 1, except that a mixed phosphor of $BaAl_{12}O_{19}$:Mn and $Zn_2SiO_4$:Mn, mixed in the weight ratio of 1:1, was used instead of the phosphor prepared in Example 1, and then the relative luminance and color coordinate characteristics of the obtained phosphor were measured.

The following Tables 1 and 2 show the relative luminance and color coordinate characteristics of phosphors prepared in Examples 1 through 14 and Comparative Examples 1 through 3.

TABLE 1

Variation in the content of boron in $Ba_{0.9}Mn_{0.1}Al_{2-y8}B_yO_{19}$

| | Content of boron (y) | Relative luminance | Color coordinates (x, y) |
|---|---|---|---|
| Comparative Example 1 | 0 | 67 | (0.175, 0.764) |
| Comparative Example 2 | 0 | 89 | (0.220, 0.714) |
| Comparative Example 3 | 0 | 86 | (0.208, 0.725) |
| Example 1 | 0.05 | 88 | (0.177, 0.765) |
| Example 2 | 0.1 | 92 | (0.180, 0.763) |
| Example 3 | 0.2 | 96 | (0.180, 0.763) |
| Example 4 | 0.3 | 95 | (0.180, 0.763) |
| Example 5 | 0.4 | 95 | (0.182, 0.763) |
| Example 6 | 0.5 | 93 | (0.184, 0.762) |

TABLE 1-continued

Variation in the content of boron in $Ba_{0.9}Mn_{0.1}Al_{12-y8}B_yO_{19}$ 

| | Content of boron (y) | Relative luminance | Color coordinates (x, y) |
|---|---|---|---|
| Example 7 | 0.75 | 91 | (0.187, 0.761) |
| Example 8 | 1.0 | 90 | (0.188, 0.757) |

TABLE 2

Variation in the content of manganese in $Ba_{1-x}Mn_xAl_{11.8}B_{0.2}O_{19}$ 

| | Content of manganese (x) | Relative luminance | Color coordinates (x, y) |
|---|---|---|---|
| Example 9 | 0.03 | 82 | (0.165, 0.765) |
| Example 10 | 0.05 | 89 | (0.174, 0.764) |
| Example 3 | 0.1 | 96 | (0.180, 0.763) |
| Example 11 | 0.125 | 94 | (0.184, 0.762) |
| Example 12 | 0.15 | 92 | (0.192, 0.758) |
| Example 13 | 0.2 | 90 | (0.193, 0.756) |
| Example 14 | 0.3 | 83 | (0.198, 0.753) |

As can be seen by the data presented in Table 1, the luminance characteristics were excellent when the content of boron was in the range of 0.2 to 0.4 mol. Phosphors prepared in Examples 1 through 8 exhibited improvement in the luminance and color purity characteristics, compared with those prepared in Comparative Examples 1 through 3. Also, Table 2 shows that the luminance and color purity characteristics of a phosphor prepared in Example 3-(that is, when the content of manganese was 0.1 mol) are particularly excellent.

Barium aluminate green-emitting phosphors prepared in Examples 1 through 14 and Comparative Examples 1 through 3 were applied to a plasma display panel and then white color temperatures of the panel were measured.

The results showed that the green-emitting phosphors according to Examples 1 through 8 and 12 had white color temperatures of 9000 K or higher, which is a considerable increase, compared to Comparative Example 1 (6500 K) and Comparative Examples 2 and 3 (6500 K and 7000 K), thereby enhancing picture quality characteristics.

While the present invention has been described with reference to specific examples, it is to be understood that the disclosure is not to be interpreted as limiting. Various alterations and their equivalents will no doubt become apparent to those skilled in the art. Accordingly, it is intended that the appended claims be interpreted as covering all alterations and their equivalents as fall within the true spirit and scope of the invention.

What is claimed is:

1. A green-emitting phosphor for a plasma display panel, represented by the formula 1:

$$Ba_{1-x}Mn_xAl_{12-y}B_yO_{19} \qquad \text{[Formula 1]}$$

wherein $0.001 \leq x \leq 0.5$ and $0.01 \leq y \leq 1.0$.

2. The green-emitting phosphor according to claim 1, wherein x is in the range of 0.03 to 0.3.

3. The green-emitting phosphor according to claim 1, wherein when x is 0.1, y is in the range of 0.2 to 0.4.

4. A method for preparing a green-emitting phosphor for a plasma display panel, represented by the formula 1:

$$Ba_{1-x}Mn_xAl_{12-y}B_yO_{19} \qquad \text{[Formula 1]}$$

wherein $0.001 \leq x \leq 0.5$ and $0.01 \leq y \leq 1.0$, the method comprising the steps of:

primarily firing a mixture of barium (Ba), manganese (Mn), aluminum (Al) and boron (B) compounds at 1000 to 1500° C. in the presence of air; and secondarily firing the resultant material at 1000 to 1500° C. under a reducing gas atmosphere.

5. The method according to claim 4, wherein the resultant material obtained after the secondary firing is washed with 1 to 20% aqueous hydrochloric solution, washed with water and dried.

6. The method according to claim 4, wherein the Ba compound is one selected from the group consisting of $BaCO_3$, BaO, $BaCl_2$, $Ba(NO_3)_2$ and $Ba[OCH(CH_3)_2]_2$, and the content thereof is 0.5 to 0.999 mol; the Mn compound is one selected from the group consisting of $MnF_2$, $MnCl_2$, MnO and $Mn(NO_3)_2 \cdot XH_2O$ in which X is an integer of 4 through 6, and the content thereof is 0.001 to 0.5 mol; the Al compound is one selected from the group consisting of $Al_2O_3$ and $Al(OH)_3$, and the content thereof is 11 to 11.99 mol; and the B compound is one selected from the group consisting of $B_2O_3$ and $H_3BO_3$, and the content thereof is 0.01 to 1.0 mol.

* * * * *